(12) United States Patent
Lin et al.

(10) Patent No.: US 7,869,235 B2
(45) Date of Patent: Jan. 11, 2011

(54) FLYBACK CONVERTER HAVING AN ACTIVE SNUBBER

(75) Inventors: Kuo-Fan Lin, Taoyuan Hsien (TW); Chien-Li Tsui, Taoyuan Hsien (TW)

(73) Assignee: FSP Technology Inc., Taoyuan Hsien (TW)

( * ) Notice: Subject to any disclaimer, the term of this patent is extended or adjusted under 35 U.S.C. 154(b) by 488 days.

(21) Appl. No.: 12/110,928

(22) Filed: Apr. 28, 2008

(65) Prior Publication Data

US 2009/0268489 A1 Oct. 29, 2009

(51) Int. Cl.
*H02H 7/122* (2006.01)

(52) U.S. Cl. ............... 363/56.11; 363/21.18; 363/56.12

(58) Field of Classification Search ............. 363/21.12, 363/21.18, 56.11, 56.12
See application file for complete search history.

(56) References Cited

U.S. PATENT DOCUMENTS

| | | | |
|---|---|---|---|
| 5,570,278 A | 10/1996 | Cross | |
| 6,069,803 A | 5/2000 | Cross | |
| 6,496,392 B2 * | 12/2002 | Odell | 363/56.11 |
| 6,876,556 B2 | 4/2005 | Zhu et al. | |
| 7,161,331 B2 | 1/2007 | Wai et al. | |
| 7,649,757 B2 * | 1/2010 | Lin | 363/56.12 |
| 2004/0085050 A1 * | 5/2004 | Jinno | 323/247 |
| 2009/0268489 A1 * | 10/2009 | Lin et al. | 363/50 |

* cited by examiner

*Primary Examiner*—Jeffrey L Sterrett
(74) *Attorney, Agent, or Firm*—Muncy, Geissler, Olds & Lowe, PLLC

(57) ABSTRACT

A flyback converter having an active snubber includes a transformer to receive input power. The transformer has a primary winding at a first side. The active snubber is coupled in parallel with two ends of the primary winding and has a first circumferential circuit coupling in parallel with the primary winding, a second circumferential circuit and a zero voltage switch unit. The second circumferential circuit is controlled by the zero voltage switch unit and incorporated with the first circumferential circuit to form double damping paths to reduce current and prevent resonance that might otherwise occur to a single circumferential circuit and the secondary side of the transformer.

7 Claims, 3 Drawing Sheets

FLYBACK CONVERTER HAVING AN ACTIVE SNUBBER

FIELD OF THE INVENTION

The present invention relates to a flyback converter having an active snubber and particularly to a flyback converter equipped with an active snubber to provide electric power damping.

BACKGROUND OF THE INVENTION

In power supply (or other electronic devices) switches such as Bipolar Junction Transistors (BJTs), MOSFET and the like are needed. They mainly aim to set current ON or OFF for circuits. As the energy of inductors in the circuits cannot be cut off abruptly, at the switch instant a spike many times of the regular voltage often occurs. When the switches are located in the circuits of a higher electric power, occurrence of the spike could damage the circuit or switches. Snubber is developed to solve this problem. It aims to harness the spike or noise at the switch instant. The snubber usually includes a capacitor and a resistor coupling in parallel with a switch, and a diode is employed to allow current to pass through one way. As there is no additional control signal to affect operation of such a snubber, it also is called a passive snubber. Reference of the passive snubber can be found in U.S. Pat. No. 7,161,331 entitled "Boost converter utilizing bi-directional magnetic energy transfer of coupling inductor". It has a primary circuit which includes a switch Q coupling in parallel with a capacitor $C_1$ and diodes $D_1$ and $D_2$ to form a passive regenerative snubber. During switching of the switch Q one way flowing of the diode $D_1$ and energy storing function of the capacitor $C_1$ can reduce excessive fluctuation of voltage and current, and prevent the switch Q from being damaged by the spike. Another snubber example can be found in U.S. Pat. No. 6,876,556 entitled "Accelerated commutation for passive clamp isolated boost converters". While the passive snubbers mentioned above and taught in other prior art can eliminate the spike, they are not controlled by signals and do not have synchronous characteristics. By contrast, there are also active snubbers. One of the examples is disclosed in U.S. Pat. No. 5,570,278 entitled "Clamped continuous flyback power converter". It has an auxiliary switch 120 and a capacitor 125 coupling in parallel with two ends of a primary winding 132. The primary winding 132 is coupled in series with a power switch 110. The auxiliary switch 120 has duty time series staggered with the power switch 110. The auxiliary switch 120 includes a body diode 122 and a body capacitor 123. The body diode 122 allows current of a leakage inductance 136 to pass through to the capacitor 125. By means of the body diode 122, body capacitor 123 and the capacitor 125 coupling in parallel with the auxiliary switch 120 it can be a substitute of the conventional passive snubber to provide functions as desired. Moreover, by synchronizing a control signal of a control means 150 with operation of the power switch 110 (at opposite duty time series) an active snubber can be formed. However, due to rapid charging and discharging a higher current $I_A$ is generated to pass through the auxiliary switch 120. The higher current causes a greater conductive loss and results in other problems because of the loss. Furthermore, resonance is generated between the capacitor 125 and anther capacitor 142 at the secondary side of the transformer that causes shifting of current phase at the secondary side. As a result the switches at the secondary side endure a higher spike voltage and result in a greater switching loss and generation of noise during switching. In order to overcome the aforesaid problems, another U.S. Pat. No. 6,069,803 entitled "Offset resonance zero volt switching flyback converter" discloses a technique to correct the problem of current phase shifting at the secondary side. In short, the passive snubbers proposed in all the techniques previously discussed are not being controlled to provide synchronous function, while the active snubber generates excessive current and causes current phase shifting at the secondary side. Although the problem of current phase shifting at the secondary side can be resolved through another circuit, the circuitry becomes more complex and the cost is higher, and circuit loss also increases.

SUMMARY OF THE INVENTION

In view of the aforesaid disadvantages occurred to the conventional techniques, the primary object of the present invention is to provide an active snubber to decrease circumferential current and resonance generated by the snubber to reduce loss and current phase shifting at the secondary side.

The invention provides a flyback converter equipped with an active snubber. The flyback converter includes a primary winding to receive input power, a primary switch to control current period of the primary winding and a pulse-width modulation (PWM) unit to output a periodic signal. The periodic signal includes an ON period and an OFF period to drive the primary switch. The active snubber is coupled in parallel with two ends of the primary winding and has a first circumferential circuit coupling in parallel with the primary winding, a second circumferential circuit and a zero voltage switch unit in sync with the PWM unit. The first circumferential circuit includes a damping capacitor and a first diode. The diode has an anode bridging the primary winding and the primary switch. The second circumferential circuit is coupled in parallel with two ends of the first diode and includes a damping control switch and an inductor. The first circumferential circuit first provides a current to pass through the damping capacitor to be absorbed thereof after the primary switch is OFF. The zero voltage switch unit receives a detection voltage between the first diode and the damping capacitor and sets a base value to be compared with the detection voltage. Through the synchronous clock of the PWM unit and a damping control signal generated by judging the detection voltage being lower than the base value, the damping control switch is driven and set ON to turn on the second circumferential circuit. Thereby a second damping current circuit is formed to reduce the current, and resonance that might otherwise occur between a single circumferential circuit and the secondary side of the transformer can be prevented.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
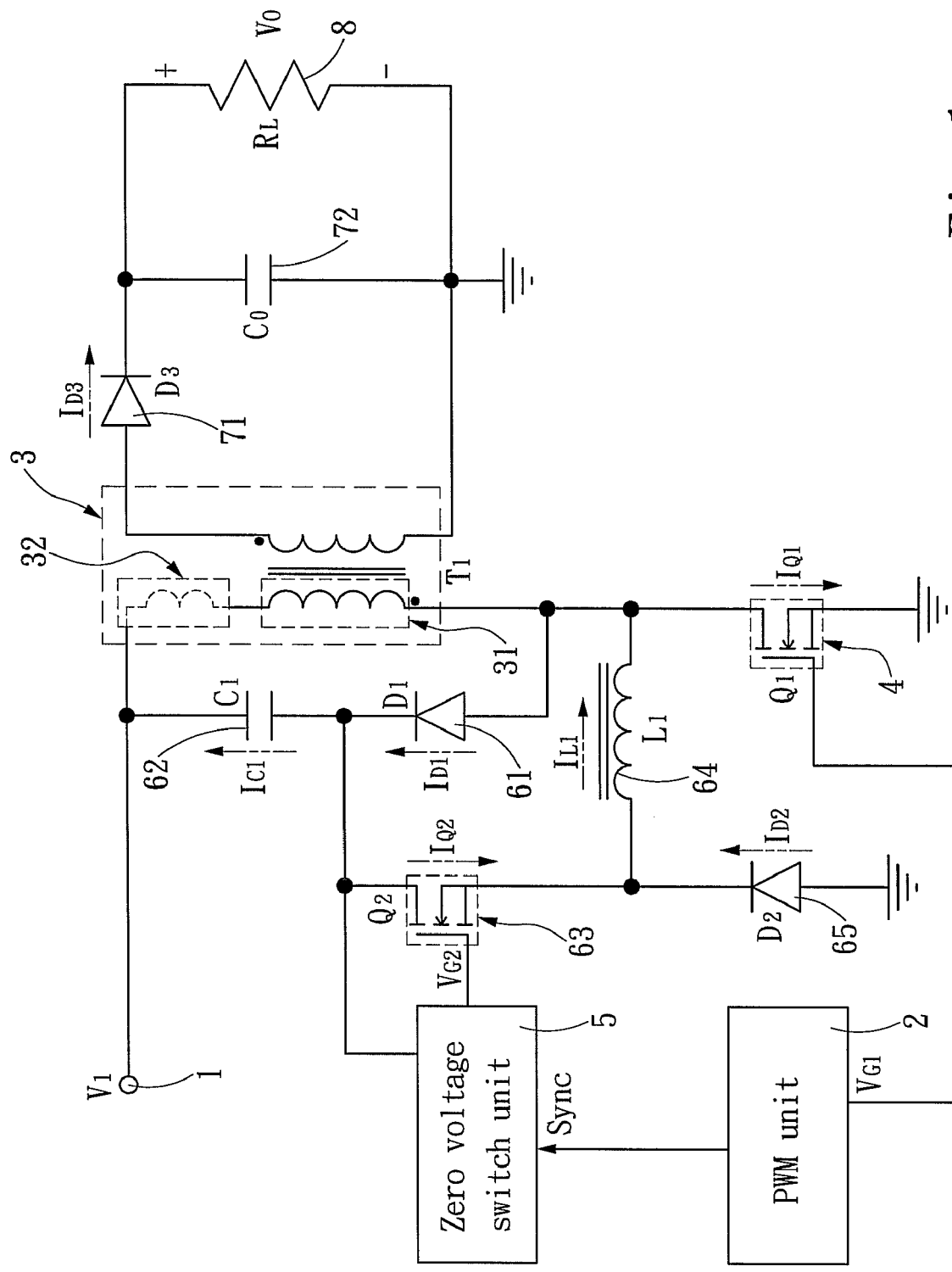
FIG. 1 is a circuit block diagram of the invention.
Figure 2:
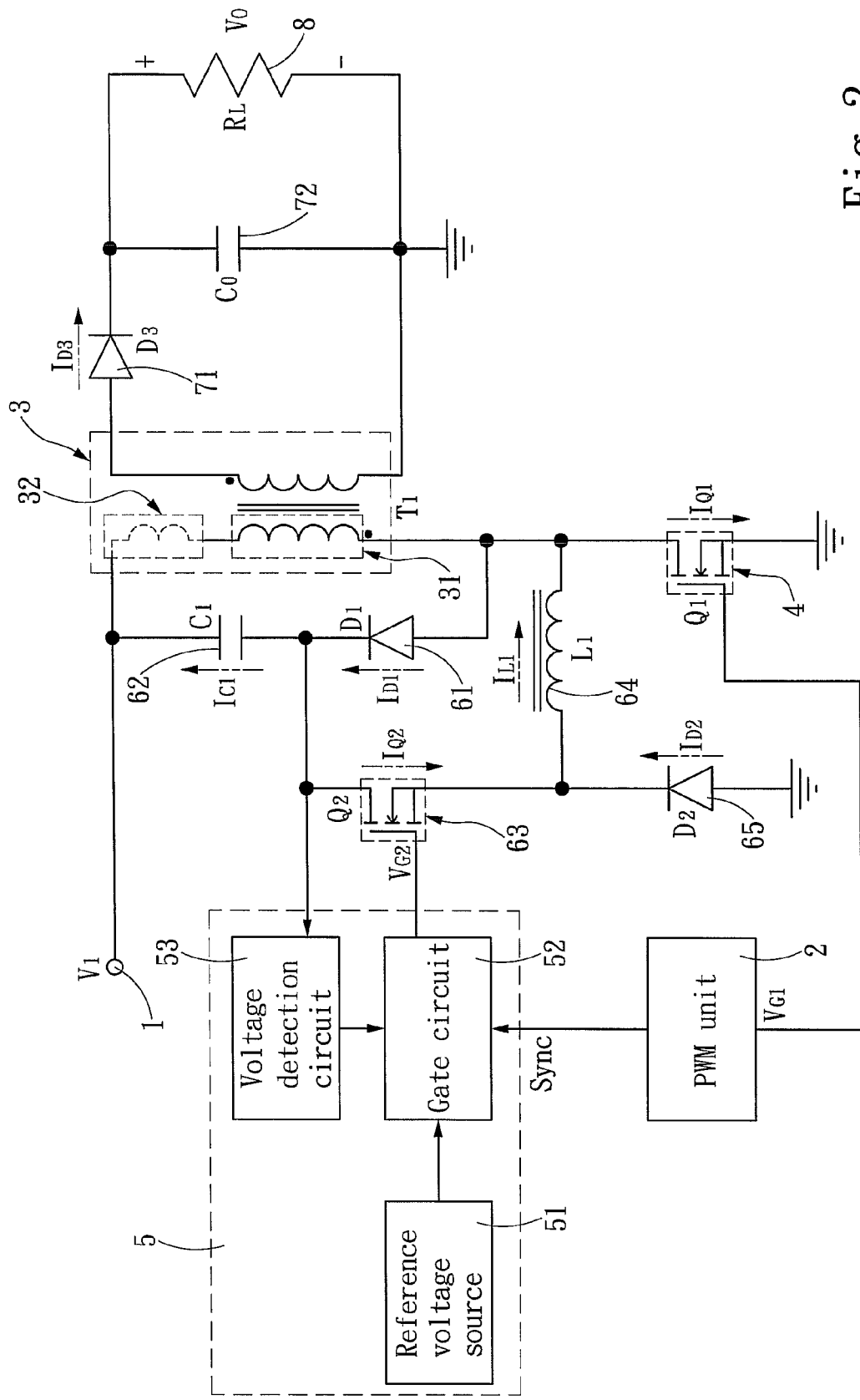
FIG. 2 is another circuit block diagram of the invention.

Please refer to FIG. 1, the invention provides a flyback converter equipped with an active snubber. The flyback converter includes a transformer 3 ($T_1$) which has a primary winding 31 at a first side to receive input power 1 that goes through energy transformation through electromagnetic inductance to be transferred to a secondary side of the transformer 3. The primary winding 31 generates a leakage inductance 32 due to not being fully coupled. A primary switch 4 is provided to connect to the primary winding 31. There is also a pulse-width modulation (PWM) unit 2 to generate a periodic signal $V_{G1}$ to drive the primary switch 4. The periodic signal includes an ON period and an OFF period to drive the primary switch 4 thereby to control a current period passing through the primary winding 31. The polarities of the secondary side of the transformer 3 and the primary winding 31 are opposite to each other to form a flyback conversion structure. The electric power sent to the secondary side through the electromagnetic inductance passes through a rectification diode 71 ($D_3$) and an output capacitor 72 ($C_o$) to be sent to a load 8. This is the basic structure of a conventional flyback converter. Its operation principle is known in the art, thus details are omitted. The invention includes the following features: the active snubber has a first circumferential circuit coupling in parallel with the primary winding. The first circumferential circuit includes a damping capacitor 62 ($C_1$) and a first diode 61 ($D_1$). The first diode 61 has an anode bridging the primary winding 31 and the primary switch 4. The damping capacitor 62 is connected to a negative pole of the first diode 61 and another end of the primary winding 31 and leakage inductance 32. The first diode 61 of the first circumference circuit further has two ends thereof coupling in parallel with a second circumference circuit. The second circumference circuit includes a damping control switch 63 ($Q_2$) and an inductor 64 ($L_1$). The inductor 64 has one end bridging the primary winding 31 and the primary switch 4. The damping control switch 63 bridges the negative pole of the first diode 61 and the inductor 64. The damping control switch 63 is controlled by a zero voltage switch unit 5. The zero voltage switch unit 5 receives a detection voltage between the first diode 61 and the damping capacitor 62. Through a sync clock (Sync) of the PWM unit 2 and by judging the detection voltage being lower than a base value (may be set 0V), a damping control signal ($V_{G2}$) is generated to drive and turn on the damping control switch 63, thereby also turn on the second circumferential circuit to allow the damping capacitor 62 to discharge. Current passes through the inductor 64 and is harnessed until the zero voltage switch unit 5 is informed through the sync clock that the next ON period of the primary switch 4 is going to start, then the damping control switch 63 is set OFF. The interval between set OFF of the damping control switch 63 and set ON of the primary switch 4 further includes a dead time to prevent overlap from taking place on the damping control switch 63 and the primary switch 4. Moreover, the damping control switch 63 and the inductor 64 of the second circumferential circuit may further be bridged by a one-way discharge circuit. The one-way discharge circuit is a discharge diode 65 which has an anode connecting to a ground end and a negative end bridging the damping control switch 63 and the inductor 64. Thereby in the dead time after the damping control switch 63 is set OFF current of the inductor 64 can also pass through the discharge diode 65 so that the current of the inductor 65 is not interrupted and generating of an excessive voltage spike can be prevented. By means of the structure set forth above, the flyback circuit has double circumferential circuits during the OFF period of the primary switch 4 to alleviate the circumferential current generated during switching of electric power. Through the second circumferential circuit the damping capacitor 62 can discharge to avoid generating resonance between the damping capacitor 62 and the output capacitor 72 at the secondary side of the transformer 3. Refer to FIG. 2 for the structure of the zero voltage switch unit 5. It includes a reference voltage source 51, a gate circuit 52 and a voltage detection circuit 53. The reference voltage source 51 provides a voltage which outputs the damping control signal and connects to two ends of the gate circuit 52. The voltage detection circuit 53 receives the detection voltage and generates a trigger signal when it judges that the detection voltage is lower than a base value. The base value is set by the voltage detection circuit 53 and may be 0. The gate circuit 52 can lock or release the voltage provides by the reference voltage source 51 according to the sync signal and trigger signal to form the damping control signal $V_{G2}$, then the zero voltage switch unit 5 can judge whether the voltage between the damping capacitor 62 and the first diode 61 is dropped lower than the base value to activate the second circumferential circuit.

Figure 3:
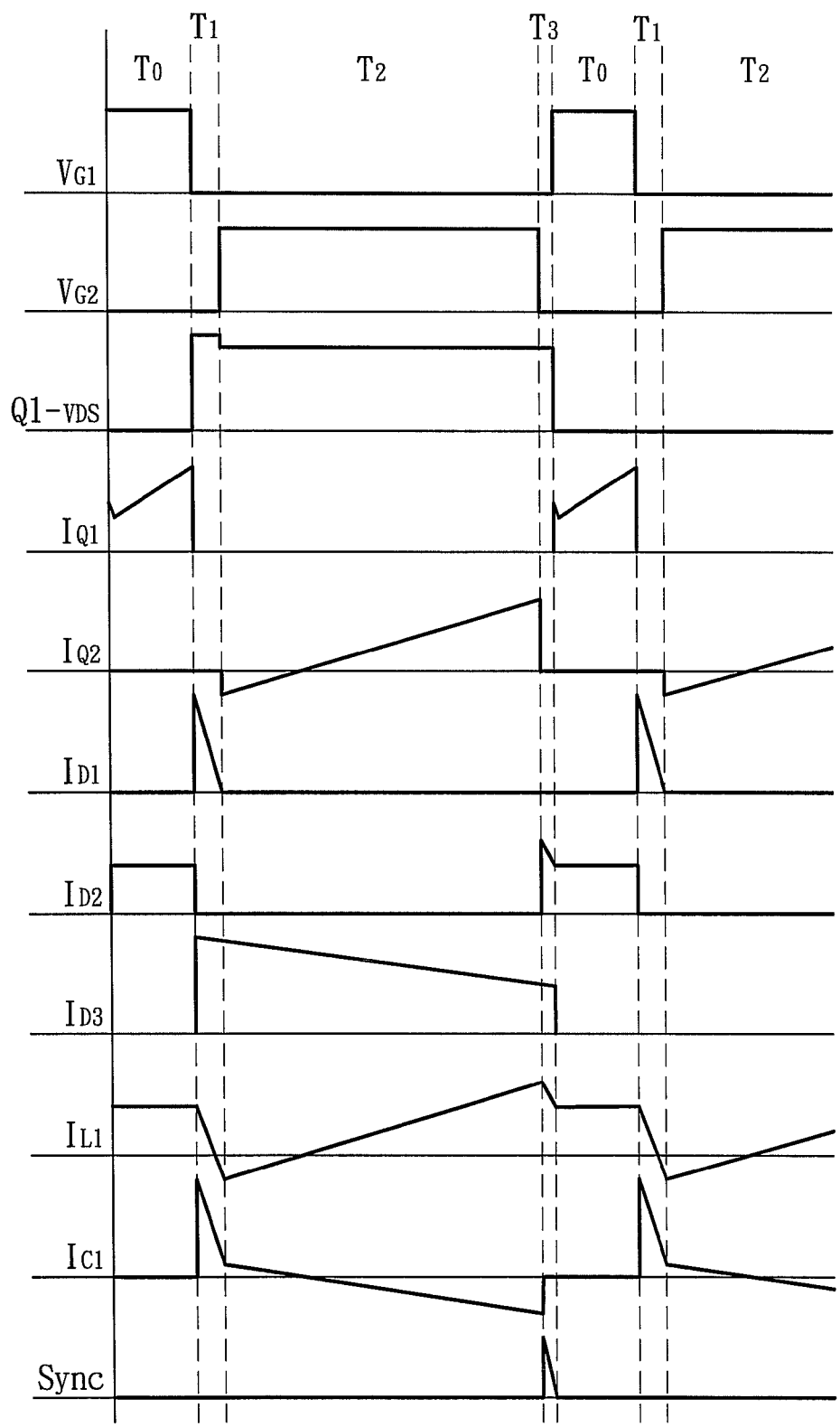
FIG. 3 is a waveform chart of the circuit of the invention.

Refer to FIG. 3 for the waveform chart of the circuit structures previous discussed. The periodic signal ($V_{G1}$) and damping control signal ($V_{G2}$) control respectively setting ON of the primary switch 4 and the damping control switch 63. $T_0$ to $T_3$ represents a complete period. At $T_0$ the primary switch 4 is still ON, and current $I_{Q1}$ passing through the primary switch 4 rises continuously, and a portion of the current flows to the primary switch 4 from the discharging diode 65 and inductor 64. At $T_1$ the damping control switch 63 is not yet activated after the primary switch 4 is OFF, the current originally passes through the primary switch 4 flows to the first diode 61 and also charges the damping capacitor 62 to form the first circumferential circuit. Meanwhile, current $I_{D3}$ at the secondary side of the transformer 3 starts to flow through the rectification diode 71. With the damping capacitor 62 being charged gradually the detection voltage at one side of the first diode 61 gradually drops to lower current $I_{D1}$. When the zero voltage switch unit 5 judges that the detection voltage is lower than a base value (in the waveform chart $I_{D1}$ drops to 0 representing the detection voltage drops to 0V) the damping control switch 63 is activated (entering $T_2$), then the damping capacitor 62 starts discharging through the damping control switch 63 and the inductor 64 to gradually increase current $I_{L1}$ flowing through the inductor 64. Finally, the sync clock Sync triggers the zero voltage switch unit 5 to turn OFF the damping control switch 63 and enter the dead time (namely $T_3$ in the waveform chart). After the dead time is elapsed, the primary switch 4 is restarted to repeat another cycle. Thus the input power 1 is periodically transformed and output to the load 8.

As a conclusion, the invention provides a significant improvement over the conventional techniques.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A flyback converter having an active snubber comprising a primary winding to receive an input power, a primary switch to control a current period of the primary winding and a pulse-width modulation (PWM) unit to output a periodic signal which includes an ON period and an OFF period to drive the primary switch, the active snubber being coupled in parallel with two ends of the primary winding, the active snubber including:

a first circuit which is coupled in parallel with the primary winding and has a damping capacitor and a first diode which has an anode connected to the primary winding and the primary switch;

a second circuit which is coupled in parallel with two ends of the first diode and has a damping control switch and an inductor which has one end connected to the primary winding and the primary switch; and a zero voltage switch unit which is synchronous with the PWM unit and receives a detection voltage between the first diode and the damping capacitor and sets a base value to be compared with the detection voltage;

wherein a damping control signal is generated through a sync clock of the PWM unit and by judging that the detection voltage is lower than a base value to drive and turn ON the damping control switch and set ON the second circuit.

2. The flyback converter of claim 1, wherein the PWM unit generates a synchronous signal output to the zero voltage switch unit to determine OFF time series of the primary switch.

3. The flyback converter of claim 2, wherein the zero voltage switch unit includes a reference voltage source, a gate circuit and a voltage detection circuit, the reference voltage source providing a voltage to the gate circuit to generate the damping control signal, the voltage detection circuit receiving the detection voltage and generating a trigger signal upon judging that the detection voltage is lower than the base value, the gate circuit locking or releasing the voltage provided by the reference voltage source according to the synchronous signal and the trigger signal.

4. The flyback converter of claim 3, wherein the base value is set by the voltage detection circuit and includes zero.

5. The flyback converter of claim 1 further having a dead time between OFF of the damping control signal and ON of the primary switch.

6. The flyback converter of claim 1, wherein the damping control switch of the second circumferential circuit and the inductor are connected to a one-way discharging circuit.

7. The flyback converter of claim 6, wherein the one-way discharging circuit is a discharging diode which has an anode connecting to a ground end and a cathode connected to the damping control switch and the inductor.

* * * * *